United States Patent
Doyle

(10) Patent No.: US 8,365,505 B2
(45) Date of Patent: Feb. 5, 2013

(54) VIRTUAL ENCLOSURE BINS IN PRINTING ARCHITECTURES

(75) Inventor: Brian P. Doyle, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1267 days.

(21) Appl. No.: 11/625,641

(22) Filed: Jan. 22, 2007

(65) Prior Publication Data

US 2008/0177419 A1 Jul. 24, 2008

(51) Int. Cl.
*B65B 3/04* (2006.01)
*B65B 35/54* (2006.01)

(52) U.S. Cl. .......................................................... 53/474

(58) Field of Classification Search .................... 53/474, 53/157; 700/220, 222, 227, 223, 226, 252; 709/239, 206, 217; 703/239, 206, 217
See application file for complete search history.

(56) References Cited

U.S. PATENT DOCUMENTS

| 4,134,581 A | 1/1979 | Johnson et al. |
| 6,119,051 A * | 9/2000 | Anderson et al. .............. 700/221 |
| 6,988,349 B2 * | 1/2006 | Woodman ....................... 53/474 |
| 2006/0106717 A1 | 5/2006 | Randle et al. |

FOREIGN PATENT DOCUMENTS

EP 0768266 A1 4/1997

* cited by examiner

*Primary Examiner* — Rinaldi I. Rada
*Assistant Examiner* — John Paradiso
(74) *Attorney, Agent, or Firm* — Duft Bornsen & Fettig LLP

(57) ABSTRACT

Improved printing architectures and associated methods are disclosed for printing enclosures in substantially real-time for insertion with a document in a mail piece. The printing architecture allows for virtual enclosure bins in place of or in addition to actual enclosure bins. When a virtual enclosure bin is referenced in a document print job, an enclosure image is identified for the virtual enclosure bin and is printed in substantially real-time to generate an enclosure. The enclosure for the virtual enclosure bin may then be inserted with the document in the mail piece.

28 Claims, 6 Drawing Sheets

VIRTUAL ENCLOSURE BINS IN PRINTING ARCHITECTURES

BACKGROUND OF THE INVENTION

1. Field of the Invention

The invention relates to the field of printing systems and, in particular, to providing printing architectures and associated methods to implement virtual enclosure bins for post-printing processes.

2. Statement of the Problem

Many companies or organizations use continuous-forms printers or fast cut-sheet printers to print documents to be mailed to individuals. One example is a company that prints credit card bills and mails the credit card bills to customers. These companies often choose to include one or more enclosures with the main document in the same envelope. The enclosures may be promotional pieces, such as marketing fliers for new products or special offers, or may be legal documents, such as a notice of a rate change, an insurance policy rider, etc. The enclosures are frequently offset-printed 4-color pieces that fit into a standard business envelope. The finished size of the enclosures is often about 3½ inches by 8 inches.

The documents are printed from a document print job provided by an application used by the company. Each document in the document print job might enclose none, all, or a subset of the available enclosures for that print job. Customers with different characteristics will often receive a different subset of the available enclosures. For example, only customers who have used their credit card to purchase from a certain type of retailer will receive a certain enclosure.

Companies that mail large volumes of documents, such as a credit card company, typically automate the process of preparing the documents for mailing as follows. First, the company creates a document print job that includes electronic images of all of the documents of a given type for a given period, and then prints the document print job on a high-speed laser printer using either cut-sheet or continuous forms to create stacks of documents that are ready for enveloping. The stacks of documents are then passed to post-printing processes. A feeder mechanism feeds the documents from the printer to an inserter (also called an enveloper). For a particular document, the inserter gathers the pages of the document into a stack. The inserter then folds the document pages in either half or thirds, depending on the size of the outer envelope. The inserter then reads some type of enclosure data from the document, such as an optical mark or a bar code, to identify any enclosures to include with the folded document. The inserter typically has one or more enclosure bins, each of which stores a stack of preprinted enclosures of a certain type. After identifying the proper enclosures for the document, the inserter inserts the folded document and the enclosures into the envelope and seals the envelope which is then ready for mailing.

The enclosure data, such as an optical mark or a barcode, which the company prints on the document controls the above inserting operation. The enclosure data specifies which of the available enclosures in which enclosure bin are to be included with the document. The enclosure data includes a code that specifies the enclosure bin from which the inserter is to feed enclosures for a particular document. Thus, each document is bundled with the proper enclosures.

One problem with present enclosure processes is that most if not all inserters have a limited number of enclosure bins. If the number of different enclosures that the company wants to include with a particular document print job exceeds the number of available enclosure bins on their machines, then the document print job has to be divided into different print jobs. Each of the print jobs would include only documents that call for the same or similar enclosures. When one of the print jobs has finished, new enclosures need to be loaded into the enclosure bins, which is referred to in the art as a new "load plan". Unfortunately, an impossible number of load plans might be required for all actual subsets of enclosures. For example, for a print job containing 200,000 documents, if there were 30 different enclosures called for by the documents in aggregate and the inserter had 10 enclosure bins, then as many as 50 different set-ups might realistically be required to insert every enclosure. Each load plan would have a different subset of 10 of the 30 enclosures. It may not be feasible to support this many load plans, so the company might have to eliminate many optional enclosures (those not required by business rules or regulations) in order to reduce the number of load plans to a reasonable number.

Having many load plans, each of which requires a separate print job and a set-up of the inserter, introduces complexity into the printing and inserting operations and reduces the possible utilization of expensive printers and inserters resulting in higher equipment and labor costs. Having many load plans may also eliminate the possibility of electronically sorting the mail pieces by ZIP code to obtain postal discounts. The number of documents for a particular load plan may not be sufficient in each ZIP code to obtain the discount. Thus, the company would have to physically sort the envelopes on an envelope sorter machine, which is time consuming and expensive.

Present enclosure processes use preprinted enclosures. This requires printing the enclosures in large quantities in advance of printing of the document print job, and then stocking the preprinted enclosures. This requires significant lead-time and results in large inventory expense for the enclosures and waste material when the company changes enclosures. Because of the lead-time required for printing and stocking preprinted enclosures, the company's marketing department cannot quickly respond to changing market conditions.

Further, due to the cost and complexity of stocking, handling, and inserting many different enclosures, it is typically not feasible to have desired variations of the enclosures. For example, it is typically not feasible to have Spanish language versions of enclosures, even though the document might be in Spanish. Typically, the company prints the enclosures well in advance, often using an external offset print supplier. There is no practical way to correlate individual enclosures to documents. Therefore, it is not feasible to personalize the enclosures, such as with a customer's account number and name.

One solution to the above problems is to use a color printer to print the documents and to also print the enclosures in-line with the documents. However, there are a number of problems with this approach. First, there would have to be extensive modifications to the application that generates the document print job or would require creating a post-printing program that adds the enclosures to the document print job. Secondly, the document would be printed in color even though black/white printing is satisfactory. This will increase per-page printing costs significantly and may require that the company upgrade most or all of its printers to color even though only a fraction of the printed pages require color. Third, if the company wants to print the enclosures on separate sheets of paper, then each enclosure sheet would need to be the size of the main document. This would waste a great deal of paper and may greatly increase postage costs by pushing many documents into the next higher postage rate category due to the much greater paper weight for the enclosures. Lastly, documents are typically printed on heavier bond paper, such as 24# bond, whereas companies often print enclosures on much lighter paper, such as 15# or 16# bond. The heavier paper for the enclosures is a waste and may be more expensive to mail.

It is desirable to use a more effective method of including enclosures with a document than is presently available.

SUMMARY OF THE SOLUTION

The present invention solves the above and other related problems through improved printing architectures and associated methods that print enclosures in substantially real-time for insertion with a document in a mail piece. The printing architecture allows for virtual enclosure bins in place of or in addition to actual enclosure bins. When a virtual enclosure bin is referenced in a document print job, an enclosure image is identified for the virtual enclosure bin and is printed in substantially real-time to generate an enclosure. The enclosure for the virtual enclosure bin may then be inserted with the document in the mail piece. Providing virtual enclosure bins solves many of the problems associated with the limited number of actual enclosure bins of an inserter.

One embodiment of the invention comprises a printing architecture for inserting enclosures with documents. The printing architecture includes a print job processing system that receives a document print job that includes a plurality of documents. A document of the document print job includes enclosure data referencing one or more enclosures, such as for a virtual enclosure bin. The print job processing system processes the enclosure data in the document to identify one or more enclosure images from an image library that corresponds with enclosures referenced in the enclosure data in the document. The print job processing system then generates an enclosure print job that includes the enclosure images. The printing architecture further includes a first printer that prints the document print job to generate the document, and also includes a second printer that prints the enclosure images to generate one or more printed enclosures. The printing architecture further includes an inserter that controls a primary feeder mechanism to feed the printed document from the first printer to the inserter, and processes the enclosure data on the printed document to identify the printed enclosures referenced in the enclosure data. The inserter then controls a secondary feeder mechanism to feed the proper printed enclosures from the second printer to the inserter based on the enclosure data. The inserter then inserts the printed enclosures in a mail piece with the printed document.

Another embodiment of the invention comprises a printing architecture for inserting enclosures with documents. The printing architecture again includes a print job processing system, a first printer and a primary feeder mechanism, a second printer and a secondary feeder mechanism, and an inserter. The print job processing system receives a document print job from an application, processes the document print job to identify a document in the document print job, and processes enclosure data in the document to identify one or more enclosure bins referenced in the enclosure data. The print job processing system identifies whether the enclosure bins comprise virtual enclosure bins. If so, the print job processing system identifies one or more enclosure images from an image library that relate to the virtual enclosure bins. The print job processing system also amends the enclosure data in the document of the document print job to reference one or more print-on-demand (POD) enclosures (the POD enclosures are the result of printing the enclosure images). The first printer then prints the document print job to generate the document, and the second printer prints the enclosure images to generate the POD enclosures. The inserter then controls the primary feeder mechanism to feed the printed document to the inserter, and processes the amended enclosure data on the printed document to identify the POD enclosures referenced in the amended enclosure data. The inserter also controls the secondary feeder mechanism to feed the proper POD enclosures to the inserter based on the amended enclosure data, and inserts the POD enclosures in a mail piece with the printed document.

The invention may include other exemplary embodiments described below.

DESCRIPTION OF THE DRAWINGS

The same reference number represents the same element or same type of element on all drawings.

DETAILED DESCRIPTION OF THE INVENTION

Figure 1:
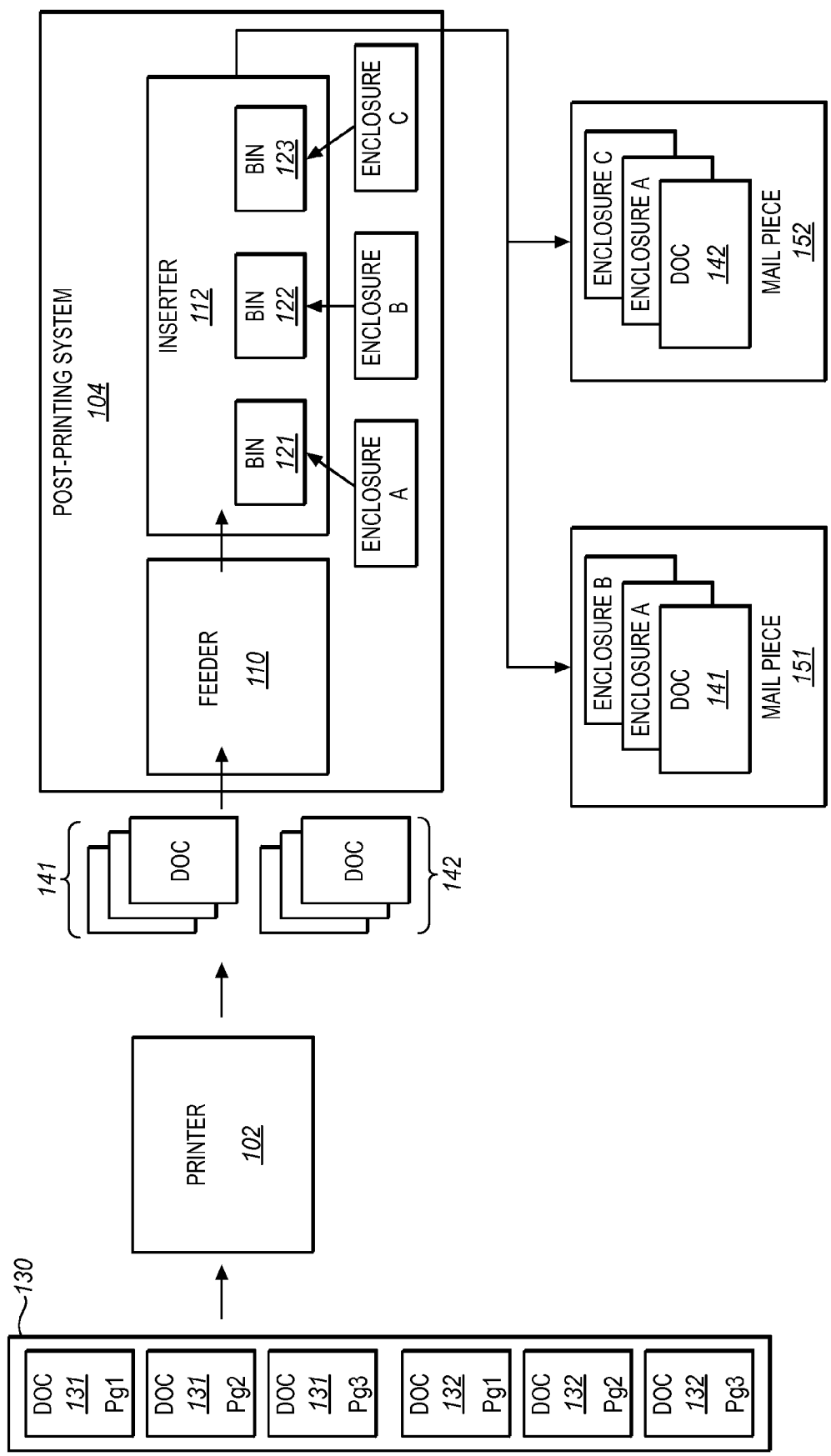
FIG. 1 illustrates a printing architecture for performing a prior art process for including enclosures with documents.

FIG. 1 illustrates a printing architecture for performing a prior art process for including enclosures with documents. The printing architecture includes a printer 102 and a post-printing system 104. Post-printing system 104 includes a feeder mechanism 110 and an inserter 112. Inserter 112 includes a plurality of enclosure bins 121-123 adapted to store preprinted enclosures.

When in operation, printer 102, which is typically a black/white continuous forms printer or a cut-sheet printer, receives a document print job 130 from an application. Document print job 130 is comprised of a plurality of documents 131-132, such as credit card statements, where each document may be one or more pages. The documents 131-132 in print job 130 also include some type of enclosure data indicating which enclosure or enclosures should be bundled with the documents 131-132 for mailing. As an example, document 131 may include enclosure data that references enclosure bin 121 and enclosure bin 122. The enclosure data indicates that the enclosure stored in bin 121 and the enclosure stored in bin 122 are to be bundled with document 131.

Printer 102 then prints document print job 130 to generate printed documents 141-142. Printed documents 141-142 are received in feeder mechanism 110, which feeds the printed documents 141-142 to inserter 112. Inserter 112 processes the enclosure data on printed documents 141-142 to determine which enclosures should be bundled with documents 141-142. For instance, inserter 112 may read a bar code on printed document 141 to determine that enclosures from bin 121 and bin 122 are to be bundled with document 131. Responsive to processing the enclosure data for printed document 141, inserter 112 takes one or more enclosures (labeled A and B) from the appropriate bins 121-123 and inserts the enclosures along with document 141 into a mail piece 151. Similarly, responsive to processing the enclosure data for printed document 142, inserter 112 takes one or more enclosures (labeled A and C) from the appropriate bins 121-123 and inserts the enclosures along with document 142 into a mail piece 152.

As discussed in the Background, there are problems with present systems for providing enclosures as in FIG. 1 because there is a limited number of enclosure bins, such as four, ten, fifteen, etc. A user of the system would thus have to change the load plan for inserter 112 each time enclosures that are not being stored in enclosure, bins 121-123 need to be bundled with the documents.

FIGS. 2-6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Embodiments of the invention described herein use virtual enclosure bins in place of or in addition to actual enclosure bins. A virtual enclosure bin is not real in the sense that an actual, physical bin is included in the inserter. A virtual enclosure bin comprises some reference to an enclosure image that may be printed in real-time to generate an enclosure. Because the enclosures are printed in real-time instead of being pre-printed and stored in an actual enclosure bin, there is an unlimited number of virtual enclosure bins available for a particular document. For instance, assume that a printing system includes an inserter having 10 actual enclosure bins. According to embodiments of the invention, an application sending a document print job to the printing system can specify enclosure bins 11, 12, 13, 14, etc, which are virtual in nature. The application is not limited to specifying one of the 10 actual enclosure bins as in prior printing systems.

Figure 2:
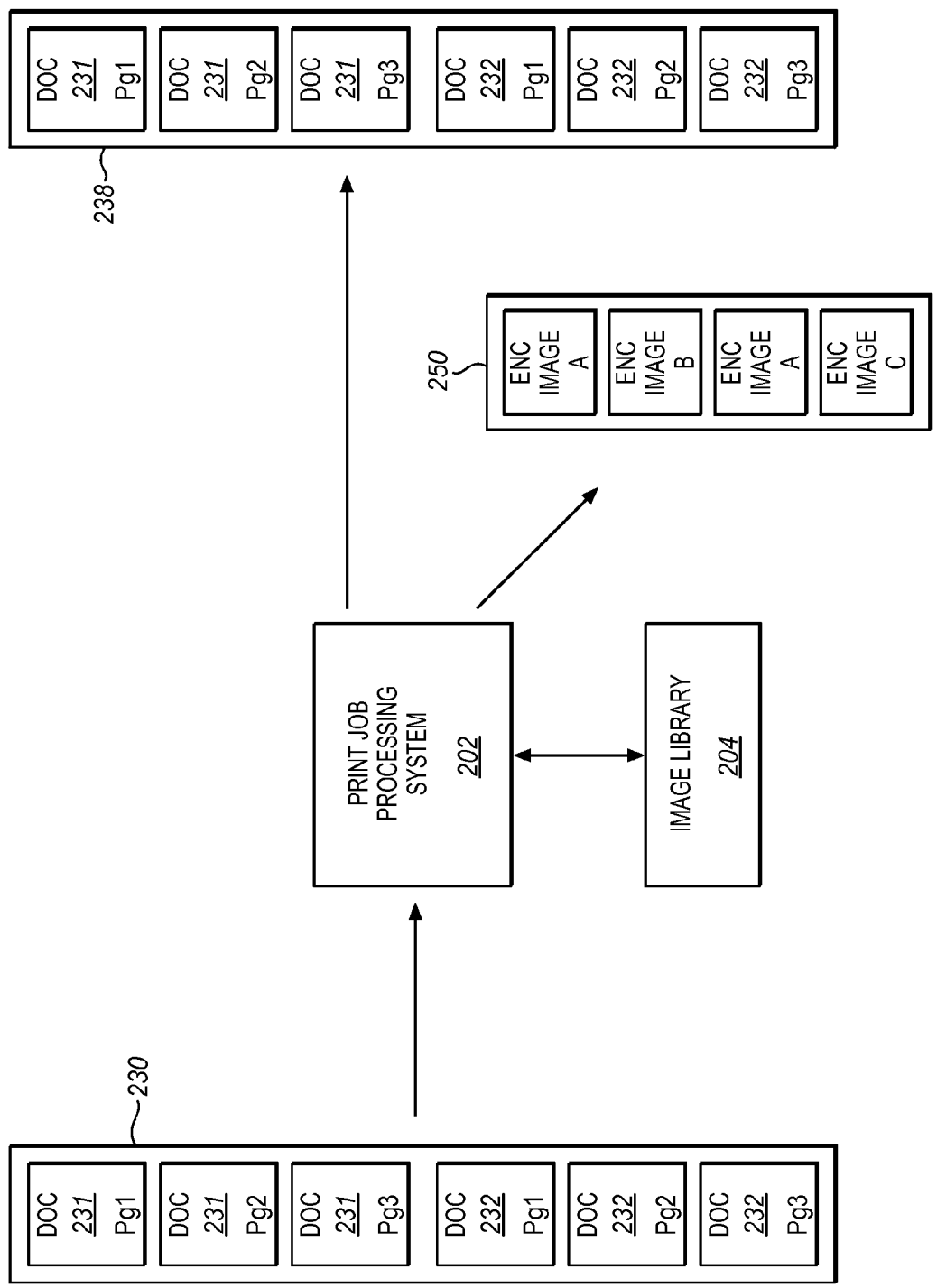
FIGS. 2-3 illustrate the printing architecture used to implement the concept of virtual enclosure bins in an exemplary embodiment of the invention.
Figure 3:
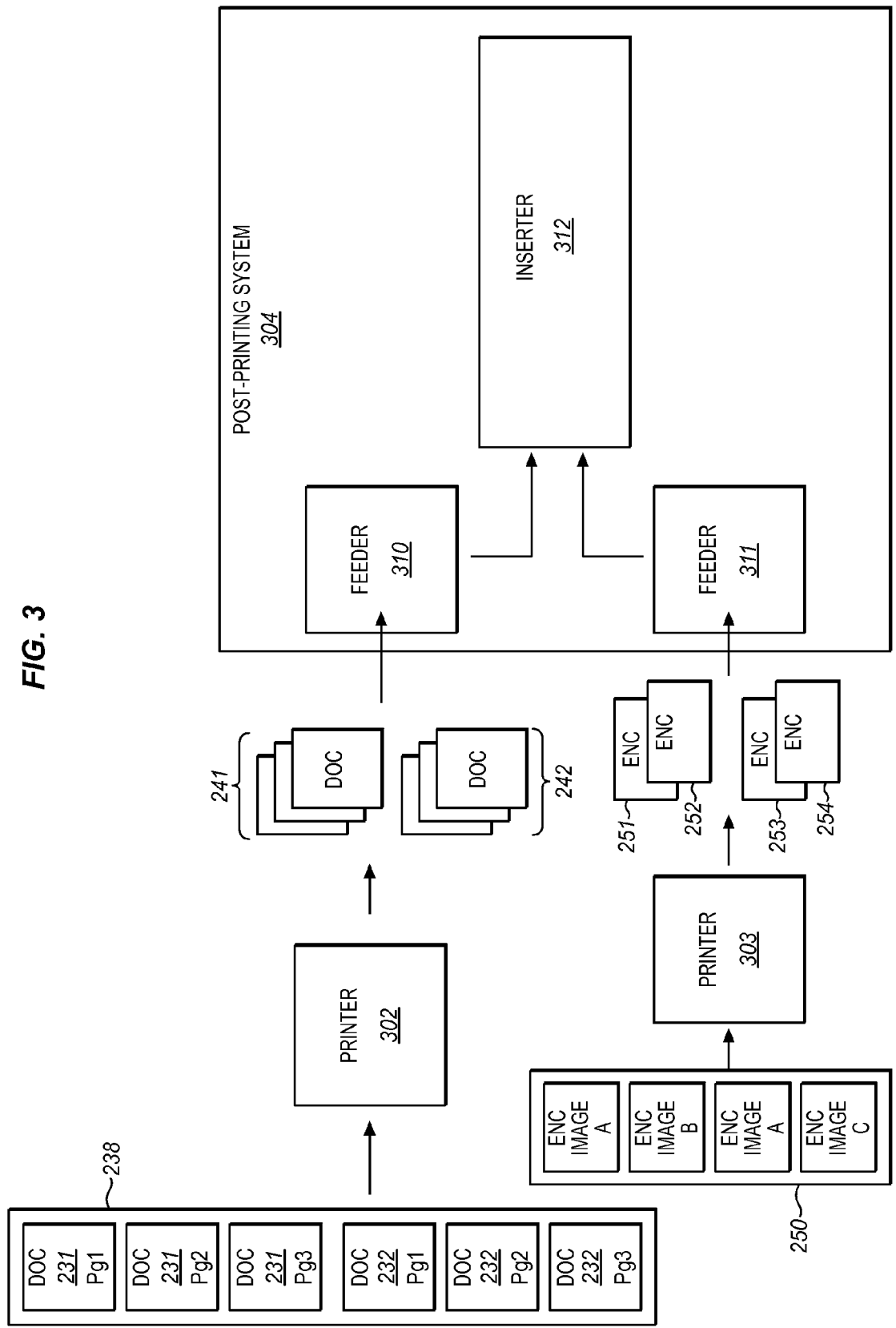

FIGS. 2-3 illustrate the printing architecture used to implement the concept of virtual enclosure bins in an exemplary embodiment. FIG. 2 illustrates a print job processing system 202 and an image library 204. Print job processing system 202 comprises any system, server, or software adapted to process document print jobs in a manner described further in FIG. 4. Print job processing system 202 may be implemented in hardware, software, or a combination of hardware and software. Image library 204 comprises any system, server, or database adapted to store enclosure images. An enclosure image comprises a file that may be printed to generate a desired enclosure. Image library 204 is accessible by print job processing system 202 through a system bus, through a network connection, or through some other means. The enclosure images may be indexed in image library 204 through an enclosure bin identifier. For instance, enclosure image A may be indexed as enclosure bin 11, where enclosure bin 11 is a virtual enclosure bin. Similarly, enclosure image B may be indexed as enclosure bin 12, where enclosure bin 12 is a virtual enclosure bin. Thus, if the document print job refers to enclosure bin 12, then the document print job is referencing enclosure image B in image library 204.

FIG. 3 illustrates printers 302-303, and post-printing system 304 that includes feeder mechanisms 310-311 and inserter 312. Printer 302 may comprise a black/white continuous forms printer or a cut-sheet printer. Printer 303 may comprise a color printer. Although printers 302-303 are shown as separate systems, printers 302-303 may comprise the same printing system providing two print flows. Primary feeder 310 is adapted to receive output from printer 302 and feed the output to inserter 312. The output from printer 302 is a plurality of documents, such as credit card bills. Secondary feeder 311 is adapted to receive output from printer 303 and feed the output to inserter 312. The output from printer 303 is a plurality of enclosures, such as advertising fliers. In one embodiment, feeder 311 is adapted to feed envelope-sized sheets, which are typically about 3.5"×8" sized sheets. Inserter 312 comprises any type of mechanism adapted to bundle documents and enclosures into a mail piece, such as an envelope. Inserter 312 may include one or more actual enclosure bins that store preprinted enclosures, which are not shown in FIG. 3. This printing architecture illustrated in FIGS. 2-3 is just one embodiment, and other printing architectures may be used in other embodiments.

Figure 4:
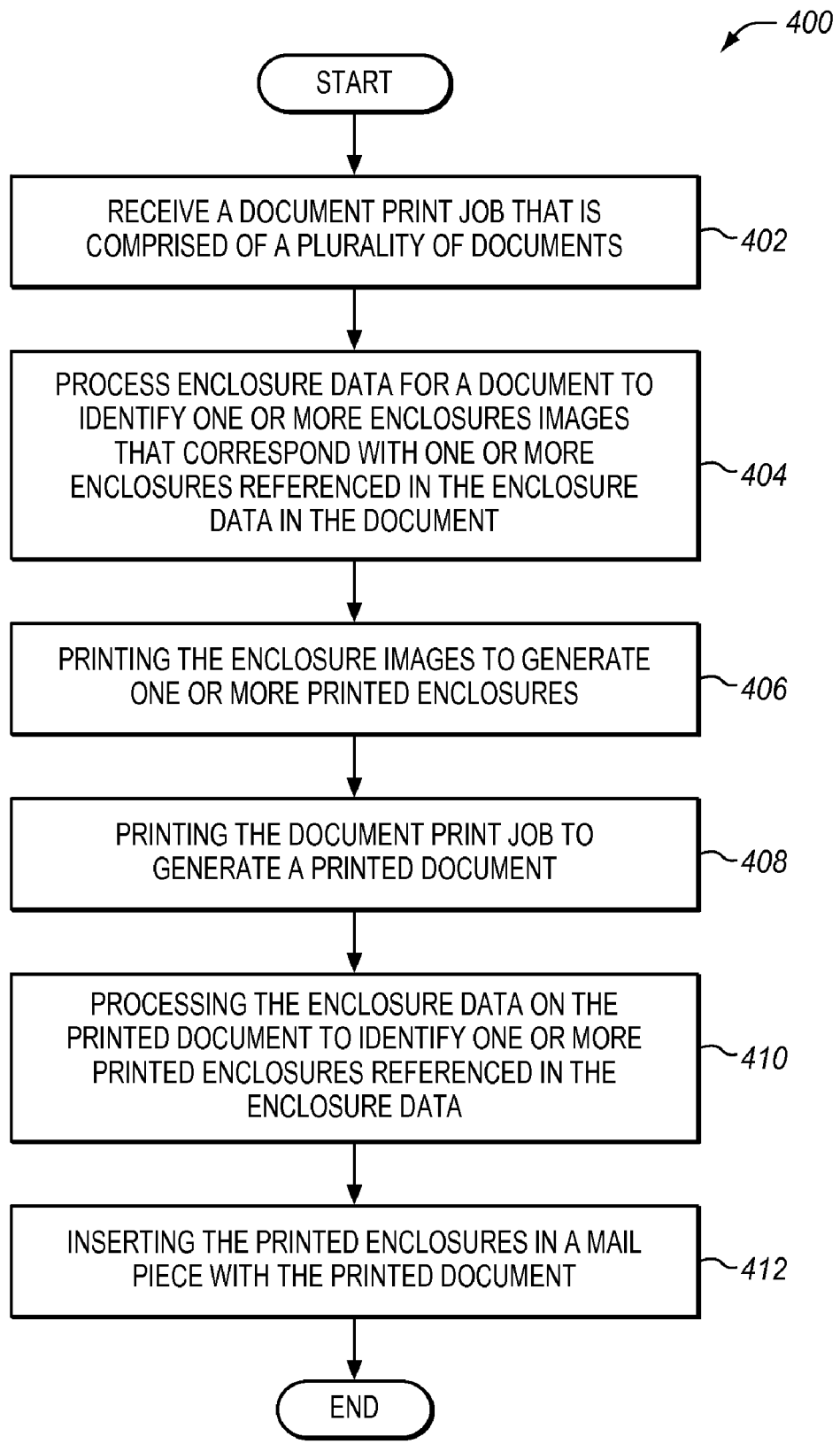
FIG. 4 is a flow chart illustrating a method of providing virtual enclosure bins in an exemplary embodiment of the invention.

FIG. 4 is a flow chart illustrating a method 400 of providing virtual enclosure bins in an exemplary embodiment of the invention. The steps of method 400 will be described with reference to the printing architecture in FIGS. 2-3. The steps of the flow chart in FIG. 4 are not all inclusive and may include other steps not shown.

In step 402, print job processing system 202 receives a document print job 230 from an application (not shown). Document print job 230 is comprised of a plurality of documents 231-232, such as credit card statements, where each document may be one or more pages. The documents 231-232 in print job 230 also include some type of enclosure data referencing one or more enclosures that should be bundled with the documents 231-232 for mailing. For instance, the enclosure data for document 231 may comprise a bar code referencing an enclosure to be bundled with document 231 or referencing an enclosure bin containing an enclosure to be bundled with document 231.

In step 404, print job processing system 202 processes the enclosure data for document 231 to identify one or more enclosure images from image library 204 that correspond with the enclosure or enclosures referenced in the enclosure data in document 231. As previously stated, image library 204 includes enclosure images used to generate enclosures when the images are printed. Based on the enclosures referred to or called in the enclosure data, print job processing system 202 identifies the appropriate enclosure image stored in image library 204. Print job processing system 202 then generates an enclosure print job 250 based on the enclosure images which it sends to printer 303 (see FIG. 3). The enclosure images and the resulting printed enclosures represent the concept of virtual enclosure bins discussed herein.

Print job processing system 202 also sends document print job 230 to printer 302. Before sending document print job 230 to printer 302, print job processing system 202 may process document print job 230 to amend the enclosure data in documents 231-232 to generate amended document print job 238. Print job processing system 202 may amend the enclosure data in documents 231-232 or encode enclosure data in documents 231-232 to reference the printed enclosures associated with documents 231-232. For instance, if the enclosure data in document 231 references virtual enclosure bins 11 and 12, then print job processing system 202 may amend the enclosure data to change the reference to virtual enclosure bins 11 and 12 to two feeds on feeder 311. Thus, the correct printed enclosures will be bundled the correct document. In other words, print job processing system 202 amends the enclosure data to synchronize printed enclosures from enclosure print job 250 with the correct document from document print job 230.

In step 406, printer 303 receives and prints the enclosure images in enclosure print job 250 to generate printed enclosures 251-254. Once printed, enclosures 251-254 are available to feeder 311 which is adapted to feed enclosures 251-254 to inserter 312.

In step 408, printer 302 receives and prints documents 231-232 in document print job 230 (or document print job 238) to generate printed documents 241-242. Once printed, documents 241-242 are available to feeder 310 which is adapted to feed document 241 to inserter 312 and to feed document 242 to inserter 312.

In step 410, inserter 312 receives document 241 and processes the enclosure data printed on document 241. For example, inserter 312 may read an optical mark or a bar code printed on document 241 to process the enclosure data. Inserter 312 processes the enclosure data to identify one or more enclosures 251-254 that are referenced in the enclosure data on document 241. These are the enclosures that are to be bundled with document 241. Assume for example that inserter 312 identifies that enclosures 251-252 are to be bundled with document 241 based on the enclosure data. Inserter 312 then inserts enclosures 251-252 in a mail piece along with document 241 in step 412.

In a similar manner, inserter 312 receives document 242 and processes the enclosure data included with document 242. Inserter 312 processes the enclosure data to identify one or more enclosures 251-254 that are referenced in the enclosure data on document 242. Assume for example that inserter 312 identifies that enclosures 253-254 are to be bundled with document 242 based on the enclosure data. Inserter 312 then inserts enclosures 253-254 in a mail piece along with document 242.

As an example of how inserter 312 may work, inserter 312 first controls feeder 310 to feed the three sheets of document 241 (see FIG. 3). Assume that one or more of the sheets of document 241 includes a barcode indicating the enclosures 251-252 to bundle with document 241. Inserter 312 thus processes the barcode to identify enclosures 251-252 that were printed by printer 303 and available at feeder 311. Inserter 312 then controls feeder 311 to feed two sheets that comprise enclosure 251 and enclosure 252. Inserter 312 then inserts the three sheets of document 241 into an envelope and inserts the two sheets comprising enclosures 251-252 into the envelope. A similar process may be performed for document 242 and other documents generated from document print job 230.

Inserter 312 may also include actual enclosure bins (not shown in FIG. 3) that store preprinted enclosures. Based on the enclosure data printed on documents 241-242, inserter 312 may also insert preprinted enclosures with the documents 241-242. For instance, inserter 312 processes the enclosure data on document 241 to identify one or more preprinted enclosures referenced in the enclosure data. The preprinted enclosures are stored in actual enclosure bins of inserter 312. Inserter 312 then inserts the preprinted enclosures in a mail piece with document 241.

In another embodiment, print job processing system 202 may personalize the enclosures 251-254 being printed on printer 303. To do so, print job processing system 202 processes a document, such as, document 231, to identify personal information for an intended recipient of the document. The personal information may be a name, an account number, etc. Print job processing system 202 may then add the personal information to the enclosure images associated with the document. The personal information will thus be printed on the enclosures that are bundled with the document.

There are many advantages provided by the printing architecture described above to provide virtual enclosure bins. For one advantage, there is an unlimited number of virtual enclosure bins available to an application. An entity can thus reduce the number of inserter load plans significantly to improve inserter throughput. The entity may also include more enclosures with the documents without increasing the number of load plans or purchasing more actual enclosure bins.

Another advantage is that print job processing system 202 can process a document print job received from the application and generate the enclosure print job and the document print job for the application. Thus, the application generating the document print job does not have to be re-programmed to handle the virtual enclosure bins.

Another advantage is that the documents can be printed on an efficient black/white printer while the enclosures may be printed on a color printer. The documents can also be printed on normal sheets sizes (8½×11 inch) on the black/white printer while the enclosures can be printed on other sheets sizes, such as 3½×8 inch sheets, on the color printer. The enclosures can also be printed on lighter weight paper than the documents.

Another advantage is that an inventory of preprinted enclosures does not have to be stored or the inventory may be much smaller, which reduces stocking costs and waste. Also, the lead-time to implement printed enclosures can be hours instead of weeks for preprinted enclosures, and changes to the enclosures can be made on a daily basis to fine-tune marketing messages or make special or limited-term offers. Also, the printed enclosures can be personalized to increase marketing impact and provide other benefits.

Another advantage is that reprints can be handled more effectively. Presently, if reprint of a document is needed, the document will typically be mailed without enclosures for a variety of reasons. According to embodiments provided herein, a reprint can be handled by reprinting the document and reprinting the enclosures associated with the document. The reprinted enclosures can then be inserted with the reprinted document in a mail piece.

Figure 5:
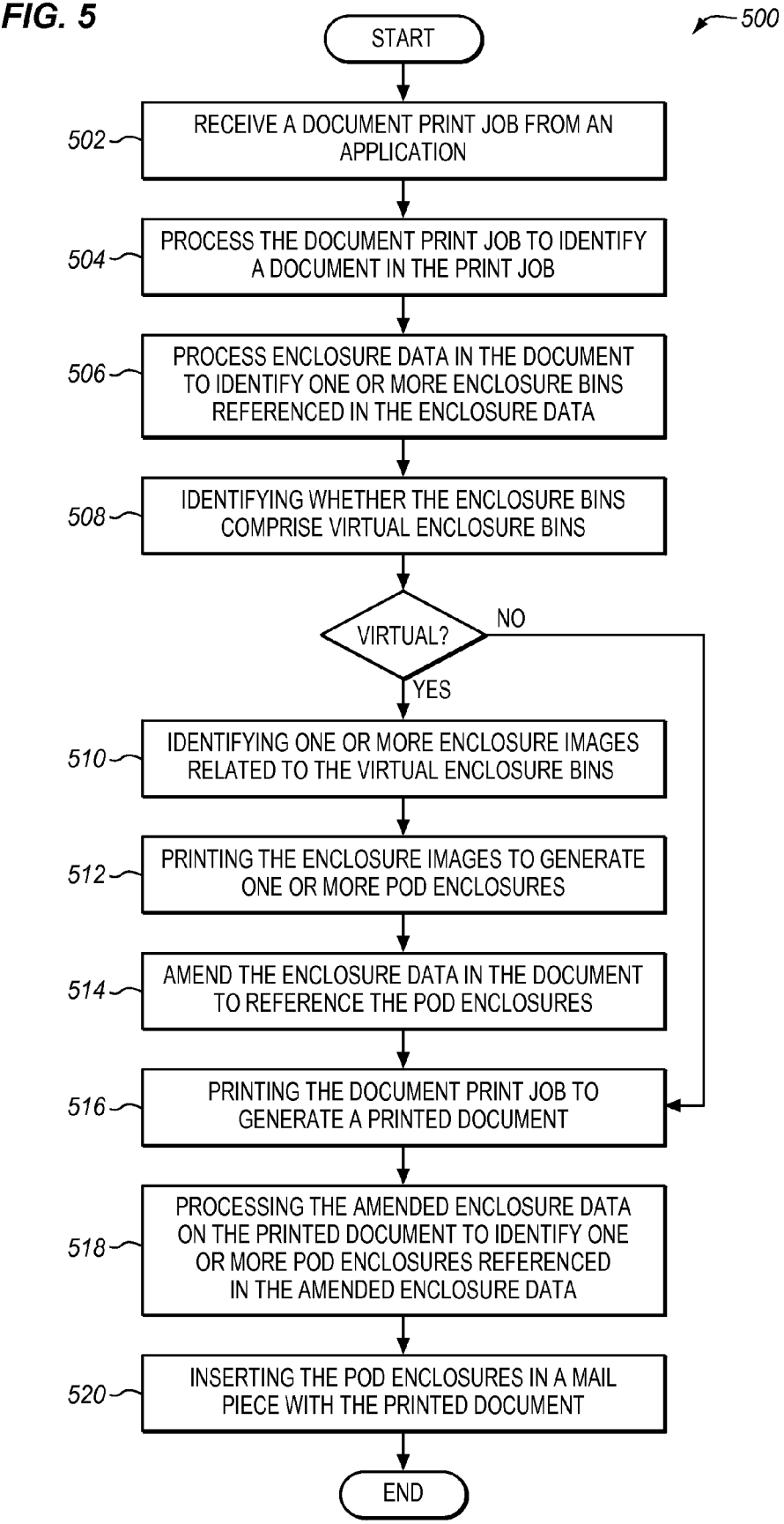
FIG. 5 is a flow chart illustrating another method of providing virtual enclosure bins in an exemplary embodiment of the invention.

FIG. 5 is a flow chart illustrating another method 500 of providing virtual enclosure bins in an exemplary embodiment of the invention. The steps of method 500 will be described with reference to the printing architecture in FIGS. 2-3. The steps of the flow chart in FIG. 5 are not all inclusive and may include other steps not shown.

In step 502, print job processing system 202 receives a document print job 230 from an application. In step 504, print job processing system 202 processes document print job 230 to identify a document 231 in document print job 230. For instance, print job processing system 202 may process document print job 230 to detect document boundaries for document 231. Print job processing system 202 may then detect the first page of document 231 in document print job 230 and determine the number of pages in document 231. Document print job 230 may include multiple documents, but one document is discussed in this example for illustration and a similar process is performed for the other documents. In step 506, print job processing system 202 processes enclosure data in document 231 to identify one or more enclosure bins referenced in the enclosure data. As previously stated, the enclosure data may include an optical mark or barcode that identifies one or more enclosure bins referenced by document 231. Alternatively, the same enclosure bin(s) may be defined for each document in document print job 230 as defined by setup parameters. The enclosure bins may include actual or virtual bins in this embodiment. For instance, if inserter 312 includes ten actual enclosure bins, then document 231 may reference one or more of the ten actual enclosure bins and/or may reference other enclosure bins that are virtual.

In step 508, print job processing system 202 identifies whether one or more of the enclosure bins comprises a virtual enclosure bin. If so, print job processing system 202 identifies one or more enclosure images from image library 204 in step 510. As an example, a bar code on document 231 may include one or more identifiers indicating the virtual enclosure bins and the actual enclosure bins called by document 231. For the virtual enclosure bin identifiers, print job processing system 202 may access a lookup table that correlates virtual enclosure bin identifiers with enclosure images. Print job processing system 202 may then identify the appropriate enclosure images in image library 204, and generate an enclosure print job 250 based on the enclosure images identified for document 231. Enclosure print job 250 may alternatively be referred to as a print-on-demand (POD) print job. Print job processing system 202 may then send enclosure print job 250 to printer 303. Printer 303 then prints the enclosure images from enclosure print job 250 to generate one or more print-on-demand (POD) enclosures 251-254 in step 512. A POD enclosure comprises an enclosure that is printed in substantially real-time instead of being preprinted. Once printed, POD enclosures 251-254 are available to secondary feeder 311 which is adapted to feed POD enclosures 251-254 to inserter 312.

In step 514, print job processing system 202 amends the enclosure data in the document 231 of document print job 230 to reference one or more POD enclosure 251-254. For instance, print job processing system 202 may amend each page in document 231 to modify or replace the barcode so that the barcode references the POD enclosures 251-254. The modification of the enclosure data is used to implement matching of document 231 to its associated POD enclosures. By amending the enclosure data, print job processing system 202 generates an amended print job 238, and sends the amended document print job 238 to printer 302. In step 516, printer 302 prints document 231 in document print job 230 to generate printed document 241. Once printed, document 241 is available to primary feeder 310 which is adapted to feed document 241 to inserter 312.

In step 518, inserter 312 receives document 241 from primary feeder 310 and processes the amended enclosure data included with document 241. For example, inserter 312 may read a bar code printed on document 241. Inserter 312 processes the enclosure data to identify one or more POD enclosures 251-254 referenced in the amended enclosure data. Once identified, inserter 312 may the control secondary feeder 311 to feed the identified POD enclosures to inserter 312.

In step 520, inserter 312 inserts one or more POD enclosures 251-254 in a mail piece with document 241. Inserter 312 uses the amended enclosure data to match POD enclosures with a document in post-printing processes. For instance, the enclosure data on a document may reference two POD enclosures that are to be bundled with the document. Inserter 312, when processing the enclosure data, may then interpret the enclosure data for a document as two sheet feeds from secondary feeder 311. The two sheet feeds provide the two desired POD enclosures, which inserter 312 bundles with the document in a mail piece.

Figure 6:
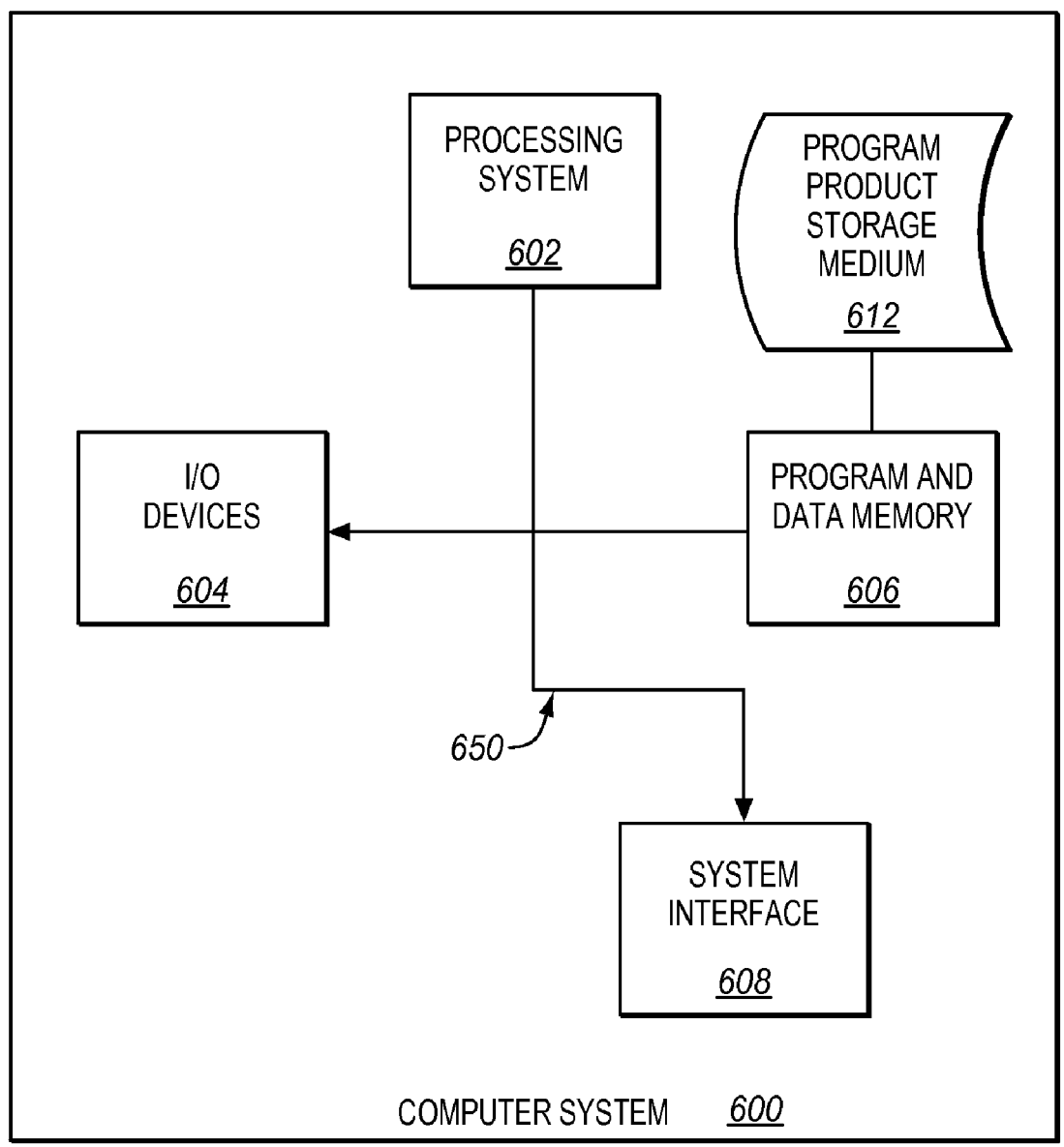
FIG. 6 illustrates a computing system in an exemplary embodiment of the invention.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 6 illustrates a computing system 600 as including a data processing device adapted to provide embodiments of the invention by executing programmed instructions and accessing data stored on a computer-readable storage medium.

Furthermore, the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processing system 602 coupled directly or indirectly to memory elements 606 through a system bus 650. The memory elements can include local memory employed during actual execution of the program code, bulk storage, and cache memories which provide temporary storage of at least some program code in order to reduce the number of times code must be retrieved from bulk storage during execution.

Input/output or I/O devices 604 (including but not limited to keyboards, displays, pointing devices, etc) can be coupled to the system either directly or through intervening I/O controllers. Network adapters or other system interfaces 608 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

I claim:

1. A method of inserting enclosures with documents in a printing architecture, the method comprising:
   receiving a document print job that includes a plurality of documents, wherein a document of the document print job includes enclosure data referencing at least one enclosure;
   processing the enclosure data in the document to identify at least one enclosure image from an image library that corresponds with the at least one enclosure referenced in the enclosure data in the document;
   printing the at least one enclosure image to generate at least one printed enclosure;
   printing the document print job to generate the document;
   processing the enclosure data on the printed document to identify the at least one printed enclosure referenced in the enclosure data; and
   inserting the at least one printed enclosure in a mail piece with the printed document.

2. The method of claim 1 further comprising:
   processing the enclosure data on the printed document to identify at least one preprinted enclosure referenced in the enclosure data; and inserting the at least one preprinted enclosure in the mail piece with the printed document.

3. The method of claim 1 wherein printing the document print job comprises:
   printing the document print job on a black/white printer to generate the document.

4. The method of claim 3 wherein printing the at least one enclosure image comprises:
   printing the at least one enclosure image on a color printer to generate the at least one printed enclosure.

5. The method of claim 1 further comprising:
   processing the document to identify personal information for an intended recipient of the printed document; and
   adding the personal information to the at least one enclosure image.

6. A method of inserting enclosures with documents in a printing architecture, the method comprising:
   receiving a document print job from an application;
   processing the document print job to identify a document in the document print job;
   processing enclosure data in the document to identify at least one enclosure bin referenced in the enclosure data;
   identifying whether the at least one enclosure bin comprises a virtual enclosure bin;
   identifying at least one enclosure image related to the virtual enclosure bin if the at least one enclosure bin comprises the virtual enclosure bin;
   printing the at least one enclosure image to generate at least one print-on-demand (POD) enclosure;
   amending the enclosure data in the document of the document print job to reference the at least one POD enclosure;
   printing the document print job to generate the document;
   processing the amended enclosure data on the printed document to identify the at least one POD enclosure referenced in the amended enclosure data; and
   inserting the at least one POD enclosure in a mail piece with the printed document.

7. The method of claim 6 further comprising:
   processing the amended enclosure data on the printed document to identify at least one preprinted enclosure referenced in the amended enclosure data; and
   inserting the at least one preprinted enclosure in the mail piece with the printed document.

8. The method of claim 6 wherein printing the document print job comprises:
   printing the document print job on a black/white printer to generate the document.

9. The method of claim 8 wherein printing the at least one enclosure image comprises:
   printing the at least one enclosure image on a color printer to generate the at least one POD enclosure.

10. The method of claim 6 further comprising:
    processing the document to identify personal information for an intended recipient of the printed document; and
    adding the personal information to the at least one enclosure image.

11. A method of processing a document print job, the method comprising:
    receiving the document print job that includes a document;
    identifying at least one enclosure image that corresponds with the document; and
    generating an enclosure print job that includes the at least one enclosure image, wherein the enclosure print job is adapted to be printed to generate at least one printed enclosure that corresponds with the document.

12. The method of claim 11 wherein identifying at least one enclosure image comprises:
    processing enclosure data in the document to identify the at least one enclosure image referenced in the enclosure data.

13. The method of claim 12 wherein processing the enclosure data comprises:
    identifying at least one enclosure bin referenced in the enclosure data; and
    correlating the at least one enclosure bin to the at least one enclosure image stored in an image library.

14. The method of claim 11 further comprising:
    encoding enclosure data in the document of the document print job wherein the enclosure data references at least one enclosure generated by printing the enclosure print job to allow an inserter to match the at least one printed enclosure with the document.

15. A printing architecture for inserting enclosures with documents, the printing architecture comprising:
    a print job processing system adapted to receive a document print job that includes a plurality of documents, wherein a document of the document print job includes enclosure data referencing at least one enclosure;
    the print job processing system further adapted to process the enclosure data in the document to identify at least one enclosure image from an image library that corresponds with the at least one enclosure referenced in the enclosure data in the document, and to generate an enclosure print job that includes the at least one enclosure image;
    a first printer adapted to print the document print job to generate the document;
    a second printer adapted to print the at least one enclosure image to generate at least one printed enclosure; and
    an inserter adapted to control a primary feeder mechanism to feed the printed document from the first printer to the inserter, and to process the enclosure data on the printed document to identify the at least one printed enclosure referenced in the enclosure data;
    the inserter further adapted to control a secondary feeder mechanism to feed the at least one printed enclosure from the second printer to the inserter based on the enclosure data;
    the inserter further adapted to insert the at least one printed enclosure in a mail piece with the printed document.

16. The printing architecture of claim 15 wherein the inserter is further adapted to:
    process the enclosure data on the printed document to identify at least one preprinted enclosure referenced in the enclosure data; and
    insert the at least one preprinted enclosure in the mail piece with the printed document.

17. The printing architecture of claim 15 wherein the first printer comprises a black/white printer.

18. The printing architecture of claim 17 wherein the second printer comprises a color printer.

19. The printing architecture of claim 15 wherein the second printer is adapted to print on paper less than letter-sized paper.

20. The printing architecture of claim 15 wherein the second printer is adapted to print on lighter weight paper than the first printer.

21. The printing architecture of claim 15 wherein the print job processing system is further adapted to:
    process the document to identify personal information for an intended recipient of the printed document; and add the personal information to the at least one enclosure image.

22. A printing architecture for inserting enclosures with documents, the printing architecture comprising:
- a print job processing system adapted to receive a document print job from an application, to process the document print job to identify a document in the document print job, and to process enclosure data in the document to identify at least one enclosure bin referenced in the enclosure data;
- the print job processing system further adapted to identify whether the at least one enclosure bin comprises a virtual enclosure bin, and to identify at least one enclosure image related to the virtual enclosure bin from an image library if the at least one enclosure bin comprises the virtual enclosure bin;
- the print job processing system further adapted to amend the enclosure data in the document of the document print job to reference at least one print-on-demand (POD) enclosure;
- a first printer adapted to print the document print job to generate the document;
- a second printer adapted to print the at least one enclosure image to generate the at least one POD enclosure;
- a primary feeder mechanism adapted to receive the printed document from the first printer;
- a secondary feeder mechanism adapted to receive the at least one POD enclosure from the second printer; and
- an inserter adapted to control the primary feeder mechanism to feed the printed document from the first printer to the inserter, and to process the amended enclosure data on the printed document to identify the at least one POD enclosure referenced in the amended enclosure data;
- the inserter further adapted to control the secondary feeder mechanism to feed the at least one POD enclosure from the second printer to the inserter based on the amended enclosure data;
- the inserter further adapted to insert the at least one POD enclosure in a mail piece with the printed document.

23. The printing architecture of claim 22 wherein the inserter is further adapted to:
- process the enclosure data on the printed document to identify at least one preprinted enclosure referenced in the enclosure data; and
- insert the at least one preprinted enclosure in the mail piece with the printed document.

24. The printing architecture of claim 22 wherein the first printer comprises a black/white printer.

25. The printing architecture of claim 24 wherein the second printer comprises a color printer.

26. The printing architecture of claim 22 wherein the second printer is adapted to print on paper less than letter-sized paper.

27. The printing architecture of claim 22 wherein the second printer is adapted to print on lighter weight paper than the first printer.

28. The printing architecture of claim 22 wherein the print job processing system is further adapted to:
- process the document to identify personal information for an intended recipient of the printed document; and
- add the personal information to the at least one enclosure image.

* * * * *